US007986303B2

(12) United States Patent
Braun et al.

(10) Patent No.: US 7,986,303 B2
(45) Date of Patent: *Jul. 26, 2011

(54) TEXTURES AND OTHER SPATIAL SENSATIONS FOR A RELATIVE HAPTIC INTERFACE DEVICE

(75) Inventors: Adam C. Braun, Sunnyvale, CA (US); Louis B. Rosenberg, San Jose, CA (US); Kenneth M. Martin, Palo Alto, CA (US)

(73) Assignee: Immersion Corporation, San Jose, CA (US)

( * ) Notice: Subject to any disclaimer, the term of this patent is extended or adjusted under 35 U.S.C. 154(b) by 751 days.

This patent is subject to a terminal disclaimer.

(21) Appl. No.: 11/861,098

(22) Filed: Sep. 25, 2007

(65) Prior Publication Data
US 2008/0048974 A1 Feb. 28, 2008

Related U.S. Application Data

(63) Continuation of application No. 10/122,089, filed on Apr. 12, 2002, now Pat. No. 7,283,123, which is a continuation of application No. 09/504,201, filed on Feb. 15, 2000, now Pat. No. 6,448,977, and a continuation-in-part of application No. 08/970,953, filed on Nov. 14, 1997, now Pat. No. 6,300,936.

(51) Int. Cl.
*G06F 3/033* (2006.01)
*G09G 5/08* (2006.01)
(52) U.S. Cl. ........................ 345/163; 715/701
(58) Field of Classification Search ............... 345/156, 345/157, 161, 163, 582; 715/700, 701, 702
See application file for complete search history.

(56) References Cited

U.S. PATENT DOCUMENTS 3,157,853 A 11/1964 Hirsch
3,220,121 A 11/1965 Cutler
(Continued)

FOREIGN PATENT DOCUMENTS

EP 0349086 1/1990
(Continued)

OTHER PUBLICATIONS

United States Patent and Trademark Office, Office Action, U.S. Appl. No. 11/227,610, mailed Nov. 17, 2008.
(Continued)

*Primary Examiner* — Ricardo L Osorio
(74) *Attorney, Agent, or Firm* — Kilpatrick Townsend & Stockton LLP

(57) ABSTRACT

Methods and systems for textures and other spatial sensations for a relative haptic interface device are described. One embodiment includes a method comprising the steps of receiving a signal from a sensor, the sensor signal associated with a change in a position of a haptic feedback device, transmitting sensor data to a host processor, the sensor data associated with the sensor signal, receiving force information from the host processor, the force information comprising a texture sensation having at least one parameter describing at least one force to be output based at least in part on an interaction of a graphical object with a texture field, the force information further comprising at least one characteristic of the texture sensation, parsing the force information, storing the at least one characteristic, and determining when to output the at least one force based at least in part on the interaction.

20 Claims, 5 Drawing Sheets

U.S. PATENT DOCUMENTS

| | | | |
|---|---|---|---|
| 3,497,668 A | | 2/1970 | Hirsch |
| 3,517,446 A | | 6/1970 | Corlyon et al. |
| 3,902,687 A | | 9/1975 | Hightower |
| 3,903,614 A | | 9/1975 | Diamond et al. |
| 3,919,691 A | * | 11/1975 | Noll .............................. 345/419 |
| 4,160,508 A | | 7/1979 | Frosch et al. |
| 4,236,325 A | | 12/1980 | Hall et al. |
| 4,414,984 A | * | 11/1983 | Zarudiansky ................. 600/587 |
| 4,513,235 A | | 4/1985 | Acklam et al. |
| 4,581,491 A | | 4/1986 | Boothroyd |
| 4,599,070 A | | 7/1986 | Hladky et al. |
| 4,708,656 A | | 11/1987 | De Vries et al. |
| 4,713,007 A | | 12/1987 | Alban |
| 4,891,764 A | | 1/1990 | McIntosh |
| 4,930,770 A | | 6/1990 | Baker |
| 4,934,694 A | | 6/1990 | McIntosh |
| 5,019,761 A | | 5/1991 | Kraft |
| 5,022,407 A | | 6/1991 | Horch et al. |
| 5,035,242 A | | 7/1991 | Franklin |
| 5,038,089 A | | 8/1991 | Szakaly |
| 5,078,152 A | | 1/1992 | Bond |
| 5,186,695 A | | 2/1993 | Mangseth et al. |
| 5,212,473 A | | 5/1993 | Louis |
| 5,240,417 A | | 8/1993 | Smithson et al. |
| 5,271,290 A | | 12/1993 | Fischer |
| 5,275,174 A | | 1/1994 | Cook |
| 5,299,810 A | | 4/1994 | Pierce |
| 5,309,140 A | | 5/1994 | Everett |
| 5,334,027 A | | 8/1994 | Wherlock |
| 5,466,213 A | | 11/1995 | Hogan |
| 5,547,382 A | | 8/1996 | Yamasaki |
| 5,766,016 A | | 6/1998 | Sinclair |
| 5,785,630 A | | 7/1998 | Bobick et al. |
| 6,111,577 A | | 8/2000 | Zilles et al. |
| 6,219,034 B1 | | 4/2001 | Elbing et al. |
| 6,422,941 B1 | | 7/2002 | Thorner et al. |
| 6,448,977 B1 | * | 9/2002 | Braun et al. .................. 715/701 |
| 7,283,123 B2 | * | 10/2007 | Braun et al. .................. 345/163 |

FOREIGN PATENT DOCUMENTS

| | | |
|---|---|---|
| JP | 02-109714 | 1/1982 |
| JP | 01-003664 | 7/1990 |
| JP | 04-007371 | 8/1993 |
| JP | 05-193862 | 1/1995 |

OTHER PUBLICATIONS

United States Patent and Trademark Office, Office Action, U.S. Appl. No. 10/314,400, mailed Nov. 10, 2008.

Baigrie, "Electric Control Loading—A Low Cost, High Performance Alternative," Proceedings, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Verlag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display in Molecular Docking," Order No. 9034744, p. 1-369, 1990.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Caldwell et al., "Enhanced Tactile Feedback (Tele-Taction) Using a Multi-Functional Sensory System," 1050-4729/93, pp. 955-960, 1993.

Adelstein, "Design and Implementation of a Force Reflecting Manipulandum for Manual Control research," DSC-vol. 42, Advances in Robotics, Edited by H. Kazerooni, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, Advances in Robotics, pp. 55-81, ASME 1992.

Russo, "Controlling Dissipative Magnetic Particle Brakes in Force Reflective Devices," DSC-vol. 42, Advances in Robotics, pp. 63-70, ASME 1992.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Adelstein, "A Virtual Environment System for the Study of Human Arm Tremor," Ph.D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings of Fourth CISM-IFToMM, Sep. 8-12, 1981.

McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Jacobsen et al., "High Performance, Dextrous Telerobotic Manipulator With Force Reflection," Intenrention/ROV '91 Conference & Exposition, Hollywood, Florida, May 21-23, 1991.

Shimoga, "Finger Force and Touch Feedback Issues in Dexterous TelemanipulatIon," Proceedings of Fourth Annual Conference on Intelligent Robotic Systems for Space Expploration, Rensselaer Polytechnic Institute, Sep. 30-Oct. 1, 1992.

IBM Technical Disclosure Bullein, "Mouse Ball-Actuating Device With Force and Tactile Feedback," vol. 32, No. 9B, Feb. 1990.

Terry et al., "Tactile Feedback in a Computer Mouse," Proceedings of Fouteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "Omar—A Haptic display for speech perception by deaf and deaf-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contactor area," Journal of the Acoustical Society of America, vol. 82, No. 4, Oct. 1987.

Bejczy at al., "Kinesthetic Coupling Between Operator and Remote Manipulator," International Computer Technology Conference, The American Society of Mechanical Engineers, San Francisco, CA, Aug. 12-15, 1980.

Bejczy et al., "A Laboratory Breadboard System for Dual-Arm Teleoperation," SOAR '89 Workshop, JSC, Houston, TX, Jul. 25-27, 1989.

Ouh-Young, "A Low-Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8-11, 1994.

Bejczy, et al., "Universal Computer Control System (UCCS) for Space Telerobots," CH2413-3/87/0000/0318501.00 1987 IEEE, 1987.

Aukstakalnis et al., "Silicon Mirage: The Art and Science of Virtual Reality," ISBN 0-938151-82-7, pp. 129-180, 1992.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24,1995.

Pimentel et al., "Virtual Reality: through the new looking glass," $2^{nd}$ Edition; McGraw-Hill, ISBN 0-07-050167-X, pp. 41-202, 1994.

Cyberman Technical Specification, Logitech Cyberman SWIFT Supplement, Apr. 5, 1994.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Kaczmarek et al., "Tactile Displays," Virtual Environment Technologies.

Scannell, "Taking a Joystick Ride," Computer Currents, Boston Edition, vol. 9, No. 11, Nov. 1994.

* cited by examiner

TEXTURES AND OTHER SPATIAL SENSATIONS FOR A RELATIVE HAPTIC INTERFACE DEVICE

CROSS REFERENCE TO RELATED APPLICATIONS

This application is a continuation of U.S. patent application Ser. No. 10/122,089, now U.S. Pat. No. 7,283,123, entitled "Textures and Other Spatial Sensations for a Relative Haptic Interface Device," filed Apr. 12, 2002, which is a continuation of U.S. patent application Ser. No. 09/504,201, now U.S. Pat. No. 6,448,977, entitled "Textures and Other Spatial Sensations for a Relative Haptic Interface Device," filed Feb. 15, 2000, and a continuation-in-part of parent patent applications:

application Ser. No. 08/970,953, now U.S. Pat. No. 6,300,936, filed Nov. 14, 1997, entitled, "Force Feedback System Including Multi-Tasking Graphical Host Environment and Interface Device,"

application Ser. No. 09/103,281, now U.S. Pat. No. 6,088,019, filed Jun. 23, 1998, entitled, "Low Cost Force Feedback Device with Actuator for Non-Primary Axis," and application Ser. No. 09/253,132, now U.S. Pat. No. 6,243,078, filed Feb. 18, 1999, entitled, "Low Cost Force Feedback Pointing Device,"

application Ser. No. 09/456,887, now U.S. Pat. No. 6,211,861, filed Dec. 7, 1999, entitled, "Tactile Mouse Device," all of which are incorporated herein by reference in their entirety.

BACKGROUND OF THE INVENTION

The present invention relates generally to interface devices for allowing humans to interface with computer systems, and more particularly to computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a mouse, joystick, trackball, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor or other graphical object in a graphical environment, where the location of the cursor is responsive to the motion of the user object.

In some interface devices, force feedback or tactile feedback is also provided to the user, more generally known herein as "haptic feedback." These types of interface devices can provide physical sensations which are felt by the user manipulating a user manipulandum of the interface device. One or more motors or other actuators are coupled to the joystick, mouse, or other device and are connected to the controlling computer system. The computer system controls forces on the joystick or mouse in conjunction and coordinated with displayed events and interactions by sending control signals or commands to the actuators. The computer system can thus convey physical force sensations to the user in conjunction with other supplied feedback as the user is grasping or contacting the interface device or manipulatable object of the interface device.

Low-cost haptic devices tend to provide tactile feedback, in which forces are transmitted to a housing or portion thereof and felt by the user, rather than kinesthetic feedback, in which forces are output directly in the degrees of freedom of motion of the interface device. For example, many currently-available gamepad controllers include a spinning motor with an eccentric mass, which outputs vibrations to the housing of the controller in coordination with events occurring in a game. In some haptic mouse devices, particular areas on the housing of the mouse can be vibrated in accordance with interaction of a controlled cursor with other graphical objects, which the user feels by touching those housing areas. These tactile devices are typically less sophisticated than kinesthetic devices and therefore are much less expensive to produce.

In addition, haptic feedback devices, such as mice in particular, can be made less costly to produce by making them relative positioning devices rather than absolute positioning devices. For example, a standard computer mouse is a relative device which provides only a change in mouse position to the host computer to control a cursor. This allows the mouse to be freely lifted from the reference surface and requires simpler encoder sensors or the like. Absolute devices, in contrast, are often constrained to an absolute sensing range and may require more expensive sensors in some embodiments.

One problem with such inexpensive haptic controllers is their limited ability to convey certain types of force sensations to the user. For example, many tactile mice are incapable of providing spring and damper sensations in the degrees of freedom of the mouse. These types of devices tend to be limited in producing other spatially-based force sensations as well. Textures, for example, are force sensations which are based on the position of a controlled cursor in a graphical environment. If the cursor is moved over a textured area, the user of the haptic device should feel forces that are output in coordination with the cursor moving over each texture bump where it is located in the graphical environment. Texture sensations are often effectively produced by imparting a damping or spring force on the mouse at regularly-spaced positions; tactile devices, however, cannot output damping or spring forces. Furthermore, it can be difficult to correlate forces with the location of texture features or other spatially-activated haptic sensations when a relative input device is used. Thus, some tactile devices of the prior art may instead provide a spatially-independent vibration to simulate a texture. Such vibrations are based on a time-based source waveform, not the motion or location of the device or the cursor, and thus tend to feel unrealistic to the user when a texture sensation is desired.

SUMMARY OF THE INVENTION

The present invention is directed to a low-cost haptic feedback device connected to a computer system, the device being a relative device that provides spatially-based sensations such as textures in correlation with a displayed graphical environment.

More specifically, the present invention relates to a haptic feedback interface device that is coupled to a host computer which implements a graphical environment. In a preferred embodiment, the device, such as a mouse, includes a housing that is physically contacted by the user, a sensor device coupled to the housing and detecting the movement of the device in a planar workspace, and an actuator coupled to the housing and applying a force to the user along an axis approximately perpendicular to the planar workspace. A local processor reports relative sensor data to the host processor, representing a relative change in position of the device, and receives force information from the host processor. The force information causes a texture sensation to be output by the actuator, the texture sensation providing a force to the user based on an interaction of a cursor with a texture field in said graphical environment, where the texture field includes predefined locations that are at least approximately spatially correlated with the forces from the texture sensation.

Preferably, the texture sensation includes a pulse that is output on the housing each time the cursor crosses a predefined region in a texture field. Each of said regions can include two borders, wherein the pulse is output when the cursor crosses one of the borders and enters the region, and when the cursor crosses said other border and exits the region. A texture command from the host can include parameters of width, spacing, and sense, where the sense is a direction of up or down.

In some embodiments, the local processor can model a position of the cursor when the cursor interacts with the texture field, where the modeled position is used for determining the force output to the user. The force information received from the host computer can include a gating command that indicates to the local processor to activate the texture sensation, and another gating command can be sent to indicate to the local processor to deactivate the texture sensation. The modeled position can be a ballistic position of said cursor that is based on a velocity of the mouse device in the workspace. The host can determine a host ballistic position based on the sensor data, where the host uses the host ballistic position to display the cursor in the graphical environment and to determine when the texture sensation should be activated and deactivated.

In preferred hardware implementations, the actuator applies an inertial force approximately along the axis perpendicular to said planar workspace by moving an inertial mass, wherein the inertial force is transmitted through the housing to the user. In other embodiments, the actuator moves a cover portion of the housing approximately perpendicularly to the planar workspace, where the cover portion contacts a portion of the user's hand. Or, the actuator can move a button of the device approximately perpendicularly to the planar workspace.

The present invention provides a low-cost, relative haptic feedback device for providing force sensations. The device can provide relative motion data to the host computer like a standard mouse, but can also provide spatially-based force sensations such as texture sensations. The spatially-based sensations are correlated with locations in the graphical environment and thus feel compelling to the user.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
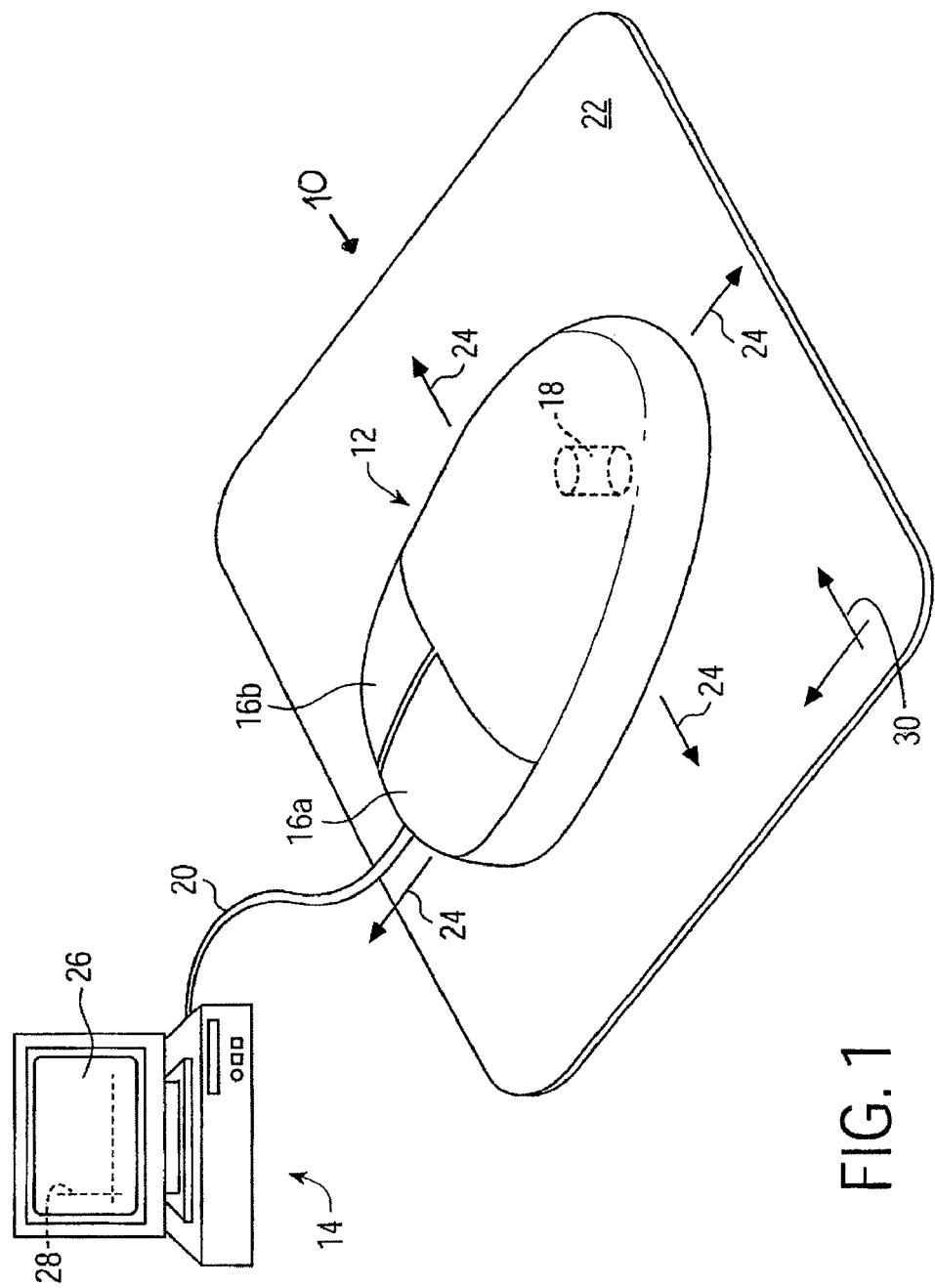
FIG. 1 is a perspective view of a mouse of the present invention connected to a host computer.

FIG. 1 is a perspective view of a haptic feedback mouse interface system 10 suitable for use with the present invention and capable of providing input to a host computer based on the user's manipulation of the mouse and capable of providing haptic feedback to the user of the mouse system based on events occurring in a program implemented by the host computer. Mouse system 10 includes a mouse 12 and a host computer 14. It should be noted that the term "mouse" as used herein, indicates an object generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but can also be implemented as a grip, finger cradle, cylinder, sphere, planar object, etc.

Mouse 12 is an object that is preferably grasped or gripped and manipulated by a user. By "grasp," it is meant that users may releasably engage a portion of the object in some fashion, such as by hand, with their fingertips, etc. In the described embodiment, mouse 12 is shaped so that a user's fingers or hand may comfortably grasp the object and move it in the provided degrees of freedom in physical space. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In addition, mouse 12 preferably includes one or more buttons 16a and 16b to allow the user to provide additional commands to the computer system. The mouse 12 may also include additional buttons. For example, a thumb button can be included on one side of the housing of mouse 12.

Mouse 12 preferably includes an actuator 18 which is operative to produce forces on the mouse 12. This operation is described in greater detail below with reference to FIG. 2.

Mouse 12 rests on a ground surface 22 such as a tabletop or mousepad. A user grasps the mouse 12 and moves the mouse in a planar workspace on the surface 22 as indicated by arrows 24. Mouse 12 may be moved anywhere on the ground surface 22, picked up and placed in a different location, etc. A frictional ball and roller assembly (not shown) can in some embodiments be provided on the underside of the mouse 12 to translate the planar motion of the mouse 12 into electrical position signals, which are sent to a host computer 14 over a bus 20 as is well known to those skilled in the art. In other embodiments, different mechanisms and/or electronics can be used to convert mouse motion to position or motion signals received by the host computer.

Mouse 12 is preferably a "relative" device, which, as referenced herein, is a device that reports a change in position of the device to the host computer rather than an absolute position in a fixed reference frame. In typical embodiments, the relative reporting allows the mouse to be moved over any surface to any location as an unbounded-workspace device, like a standard mouse (although in some embodiments bounded-workspace devices may also provide relative reporting).

Mouse 12 is coupled to the computer 14 by a bus 20, which communicates signals between mouse 12 and computer 14 and may also, in some preferred embodiments, provide power to the mouse 12. Components such as actuator 18 require power that can be supplied from an interface such as a USB or Firewire (IEEE 1394) bus. In other embodiments, signals can be sent between mouse 12 and computer 14 by wireless transmission/reception. In some embodiments, the power for the actuator can be supplemented or solely supplied by a power storage device provided on the mouse, such as a capacitor or one or more batteries. Some embodiments of such are disclosed in U.S. Pat. No. 5,691,898, incorporated herein by reference.

Host computer 14 is preferably a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game console systems commonly connected to a television set or other display, such as systems available from Nintendo, Sega, or Sony. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, disk drives, and other components of computers well-known to those skilled in the art.

Host computer 14 preferably implements a host application program with which a user is interacting via mouse 12 and other peripherals, if appropriate, and which may include force feedback functionality. For example, the host application program can be a video game, word processor or spreadsheet, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals derived from the electronics and sensors of mouse 12, and outputs force values and/or commands to be converted into forces output for mouse 12. Suitable software drivers which interface such simulation software with computer input/output (I/O) devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI.

As shown in FIG. 1, the host computer may have its own "host frame" 28 which is displayed on the display screen 26. In contrast, the mouse 12 has its own workspace or "local frame" 30 in which the mouse 12 is moved. In a position control paradigm, the position (or change in position) of a user-controlled graphical object, such as a cursor, in host frame 28 corresponds to a position (or change in position) of the mouse 12 in the local frame 30. The offset between the object in the host frame and the object in the local frame can be changed by the user by indexing, e.g., moving the mouse while no change in input is provided to the host computer, such as by lifting the mouse from a surface and placing it down at a different location or turning off input to the host while the device is moved.

In alternative embodiments, the mouse can be a different interface or control device. For example, a force feedback trackball can use the textures described herein. Or, a handheld remote control device can be used to select functions of a television, video cassette recorder, sound stereo, internet or network computer (e.g., Web-TV™), or a gamepad controller for video games or computer games, can be used with the haptic feedback components described herein. Handheld devices are not constrained to a planar workspace like a mouse but can still benefit from the texture sensations described herein which, for example, can be output perpendicularly from the device's top surface or which can be output on a joystick or other moveable object on the device.

Figure 2:
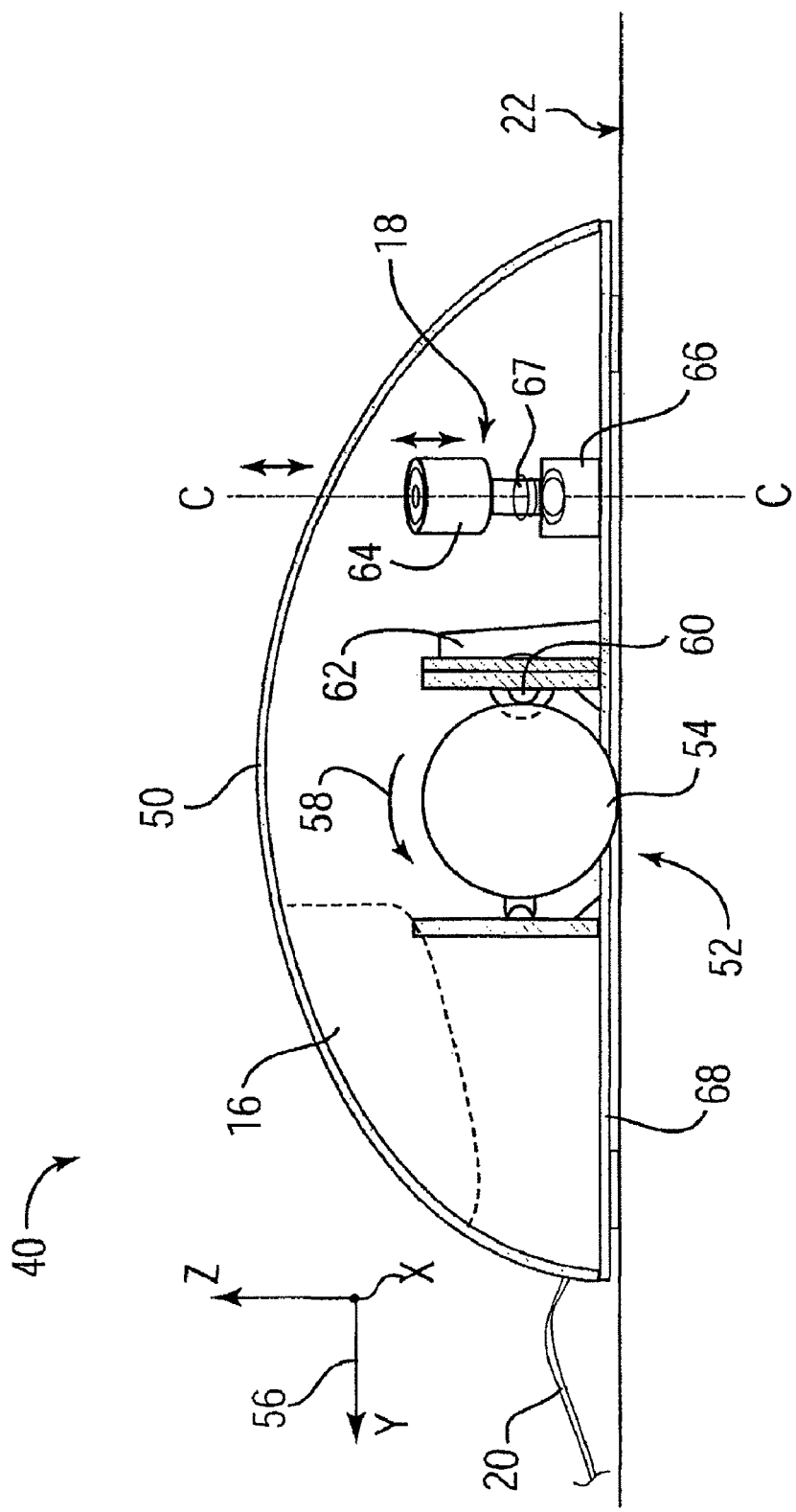
FIG. 2 is a side cross sectional view of the mouse of FIG. 1.

FIG. 2 is a side cross-sectional view of one embodiment 40 of mouse 12 of FIG. 1. Mouse 12 includes one or more actuators 18 for imparting haptic feedback such as tactile sensations to the user of the mouse.

Mouse 12 includes a housing 50, a sensing system 52, and an actuator 18. Housing 50 is shaped to fit the user's hand like a standard mouse while the user moves the mouse in the planar degrees of freedom and manipulates the buttons 16. Other housing shapes can be provided in many different embodiments.

Sensing system 52 detects the position of the mouse in its planar degrees of freedom, e.g. along the X and Y axes. In the described embodiment, sensing system 52 includes a standard mouse ball 54 for providing directional input to the computer system. Ball 45 is a sphere that extends partially out the bottom surface of the mouse and rolls in a direction corresponding to the motion of the mouse on a planar surface 22. For example, when the mouse 12 is moved in a direction indicated by arrow 56 (y direction), the ball rotates in place in a direction shown by arrow 58. The ball motion can be tracked by a cylindrical roller 60 which is coupled to a sensor 62 for detecting the motion of the mouse. Sensor 62 be any of a variety of types of sensors, such as optical encoders, analog potentiometers, etc. A similar roller and sensor 28 can be used for the x-direction which is perpendicular to the y-axis.

Figure 4A:
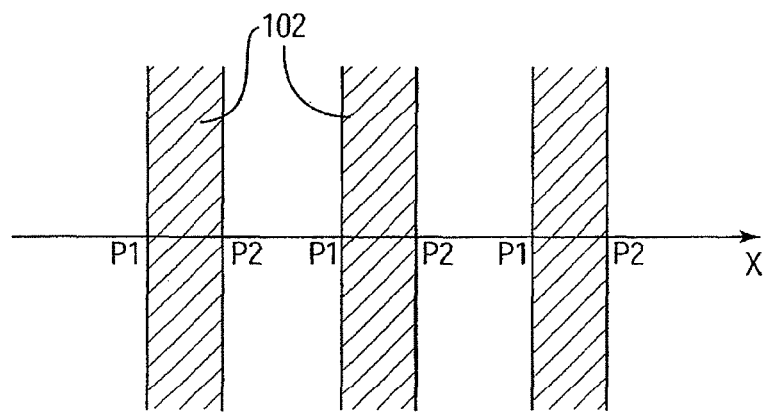
FIGS. 4a and 4b illustrate a texture field and a device element position, respectively, for an embodiment providing texture pulses with decay.

Other types of mechanisms and/or electronics for detecting planar motion of the mouse 12 can be used in other embodiments. For example, in certain embodiments, high frequency tactile sensations can be applied by the actuator that cause a mouse ball 45 to slip with respect to the frictionally engaged rollers. This is problematic, causing the mouse to be less accurate because of the tactile sensations. To remedy this problem, a more preferred embodiment employs the actuator 18 within an optical mouse that has no moving mouse ball component. A suitable optical mouse technology is made by Hewlett Packard of Palo Alto, Calif. and can be advantageously combined with the tactile sensation technologies described herein, where the optical sensor detects motion of the mouse relative to the planar support surface by optically taking and storing a number of images of the surface and comparing those images over time to determine if the mouse has moved. For example, the Intellimouse® Explorer or Intellimouse® with Intellieye™ mouse devices from Microsoft Corporation use this type of sensor. If a local microprocessor is employed (see FIG. 4), the control of the tactile element can be performed by the same local processor that controls the optical sensor technology, thereby reducing component costs (i.e., there is no need to have one processor for the optics and one processor for the tactile feedback). Alternatively, a portion of an optical sensor can be built into the surface 22 to detect the position of an emitter or transmitter in mouse 12 and thus detect the position of the mouse 12 on the surface 22.

An actuator 18 is coupled to the housing 50 to provide haptic feedback to the user. In one embodiment of the present invention, an actuator is coupled to an inertial mass that is moved by the actuator. The actuator is also coupled to the housing of the mouse such that inertial forces caused by the motion of the inertial mass are applied to the housing of the mouse with respect to the inertial mass, thereby conveying haptic feedback such as tactile sensations to the user of the mouse who is contacting the housing. Thus, the actuator does not directly output forces to the user or to a user-manipulatable object, but instead the moving mass creates an inertial force that is indirectly transmitted to the user.

The preferred embodiment 40 creates inertial forces that are directed substantially in a particular degree of freedom, i.e. along a particular axis. The inertial forces can be created, for example, using a high bandwidth linear actuator; preferred actuators include a linear moving voice coil actuator and a linear moving-magnet actuator, which are suitable for high bandwidth actuation. A traditional servo motor used in a harmonic drive configuration can also be a suitable high bandwidth actuator. This embodiment allows for high fidelity control of force sensations in both the frequency and magnitude domains. This also allows the forces to be directed along a desired axis and allows for crisp tactile sensations that can be independently modulated in magnitude and frequency.

The mouse device of the present invention preferably applies inertial forces substantially along the Z axis, orthogonal to the planar X and Y axes used for mouse motion and input. Tactile sensations can be applied at a perceptually strong level for the user without impairing the ability to accurately position a user controlled graphical object in the X and Y axes. Furthermore, since the tactile sensations are directed in a third degree of freedom relative to the two-dimensional mouse planar workspace and display screen, jolts or pulses output along the Z axis feel much more like three-dimensional bumps or divots to the user, increasing the realism of the tactile sensations and creating a more compelling interaction. For example, an upwardly-directed pulse that is output when the cursor is moved over a window border creates the illusion that the mouse is moving "over" a bump at the window border.

Alternatively, directed inertial forces can be output along the X and Y axes in the planar workspace of the device and can be compensated for to prevent or reduce interference with the user's control of the device. One method to compensate is to actively filter imparted jitter in that workspace, as disclosed in a pending patent application Ser. No. 08/839,249, incorporated herein by reference; however, this implementation may add complexity and cost to the mouse device.

In the described embodiment, actuator 18 is a linear electromagnetic actuator having a stationary portion 66 coupled to the mouse housing 50 (and thus stationary only with respect to the portion of the mouse housing to which it is coupled), and a moving portion 67 that moves linearly approximately along the Z-axis. In the described embodiment, the stationary portion 66 includes a magnet and the moving portion 67 includes a wire coil. An inertial mass 64 is coupled to (or is integral to) the linearly-moving portion of the actuator. The actuator 18 is operative to oscillate the inertial mass 64 quickly along the axis C which is approximately parallel to the Z axis. Thus, inertial forces produced by the moving mass 64 are transmitted to the housing through the stationary portion 66 of the actuator 18 and felt by the user. These forces are substantially directed along the Z axis and therefore do not substantially interfere with motion of the mouse along the X and Y axes. Preferably, the mass has an origin position that is positioned between the extremes of the range of motion of the mass. In some embodiments, a spring compliance is built into the actuator or the mass so that the mass returns to the origin position when no forces are exerted on the mass by the actuator.

Actuator 18 can be a linear voice coil actuator as described in copending patent application Ser. No. 09/253,132, which is incorporated herein by reference. In other embodiments, the stationary portion can be the coil and the moving portion can be the magnet. Actuator 18 can be other types of actuators in other embodiments. For example, an actuator coupled to a flexure may provide size and cost advantages, as described in copending provisional application 60/172,953, filed Dec. 21, 1999, entitled, "Haptic Interface Device Providing Linear Tactile Sensations Using a Rotary Actuator," and incorporated herein by reference, can be used to provide linear inertial forces on the mouse housing. The actuator 18 can be placed in a variety of positions within the mouse housing. For example, the actuator 18 can be connected to the bottom, a side, or top portion of the housing 50, although it is preferred that the actuator be oriented to output forces approximately along the Z-axis (and thus the bottom or top may be preferable to the side). A variety of tactile sensations can be output to the user, many of which are described in copending application Ser. No. 09/456,887, entitled, "Tactile Mouse Device."

An additional challenge of applying a compelling tactile sensation to the mouse housing along the described Z axis is that the mouse sits upon a table or other surface 22 and is therefore physically grounded along that Z axis. In other words, the forces applied by the actuator 18 along the Z axis, with respect to the inertial mass, are countered by the normal forces applied by the table surface upon the mouse housing. One way to accommodate these countering forces is to use a flexible or semi-flexible surface under the mouse such as a standard mouse pad. This type of flexible surface increases the transmissibility of the inertial forces from the actuator to the housing. Alternate embodiments include coupling the stationary portion 66 of the actuator 18 to a portion of the housing 50 that is different from the base or bottom portion 68 of the housing (e.g. the side of the housing), and providing an amount of flex between the actuator-coupled portion of the mouse housing and the base portion 68 that is in contact with the surface 22. For example, flexible hinges or connecting members can couple the two portions. This too improves the transmissibility of the tactile sensations, and can also be used in conjunction with a mouse pad for still better force transmissibility.

Buttons 16 can be selected by the user as a "command gesture" when the user wishes to input a command signal to the host computer 14. The user pushes a button 16 down (in the degree of freedom of the button approximately along axis z) to provide a command to the computer. The command signal, when received by the host computer, can manipulate the graphical environment in a variety of ways. In one embodiment, an electrical lead can be made to contact a sensing lead as with any mechanical switch to determine a simple on or off state of the button. An optical switch or other type of digital sensor can alternatively be provided to detect a button press. In a different continuous-range button embodiment, a sensor can be used to detect the precise position of the button 16 in its range of motion (degree of freedom). In some embodiments, one or more of the buttons 16 can be provided with force feedback (in addition to the inertial tactile feedback from actuator 18), as described in copending patent application Ser. No. 09/235,132.

In other embodiments, "contact forces" rather than inertial forces are applied to the user by moving a member of the mouse to contact the user's hand or other body portion. For example, copending patent application Ser. No. 09/103,281 describes an embodiment in which a cover portion (or a portion of the cover) of the mouse is vibrated or moved to cause haptic feedback to the user contacting the cover portion. Copending patent application Ser. No. 09/103,281 describes tactile sensations that can be output using the mouse button. Other haptic mouse embodiments are described in provisional application Ser. No. 60/176,108, entitled, "Low Cost Haptic Mouse Implementations," filed Jan. 14, 2000. All of these applications are incorporated herein by reference. These embodiments can be used with the texture sensations of the present invention.

Texture Sensations

FIG. 3 is a diagrammatic illustration of a texture field 100 displayed on a display screen in a graphical environment. In the example shown, the texture field includes a number of vertical regions 102 which cause the output of forces on the mouse 12 when the user-controlled cursor 104 interacts with the regions 102. When the user moves the cursor 104 quickly over the texture field, the field may feel like pulling a stick over a metal grating, pulling a finger over tennis racket strings, or other textures. The regions 102 have predefined locations in the graphical environment and the texture sensations are spatially correlated with these particular locations, giving the user the illusion that the displayed regions have a particular feel. Some applications and embodiments of textures are described in copending application Ser. Nos. 08/571, 606 and 08/924,462, both incorporated herein by reference.

A texture sensation can be specified in a variety of ways. For example, a texture command in the Immersion API available from Immersion Corp. can include the parameters of WIDTH, SPACING, and MAGNITUDE. The width parameter is the width of each vertical region 102, and the spacing parameter is the distance between successive vertical regions 102 (measured from the center of each vertical region). The magnitude of the texture force is specified by the magnitude parameter. Other parameters can also be included if desired. For example, the texture can be oriented vertically or horizontally (with horizontal regions instead of vertical regions 102), or both, forming a grid. In some embodiments, the spacing can also be made to vary within a single texture field, so that regions 102 may be spaced closer in one area of the field 100 and further apart in a different area of the field 100. Also, a texture can preferably be specified to have a particular spacing when moving the cursor/device in one direction across the texture field, and having a different spacing when moving the cursor/device in an opposite (or other) direction across the texture field.

When using a kinesthetic device able to output forces in the degrees of freedom of motion of the mouse, the texture field can be implemented in different ways. One way is to designate each vertical region 102 a damping region, where a damping output force resists motion of the mouse based on current mouse velocity while the cursor is in a vertical region 102. When the cursor is moved quickly over the texture field 100, a grating type feel results. Another way to provide a texture feel is to provide a spring force centered at, for example, the center of each vertical region 102. The spring can resist motion of the mouse in either direction away from the center position of each region 102, where the resistance is based on the distance from the center point. Discontinuities might be felt by the user between adjacent vertical regions when moving cursor across the texture field, but such discontinuities can be mitigated by sloping down the magnitude of the spring force between regions 102.

The texture methods described above, however, are not typically feasible for a z-axis tactile-only device, since damping and spring forces cannot be output in the degrees of freedom of the mouse device 12 in this type of device. The texture sensation, however can be simulated in other ways for a tactile device.

In a first embodiment, a "pulse" or jolt can be output on the tactile device when the cursor is moved across a designated line located in the graphical environment. A pulse can be achieved by applying a crisp, short force between an inertial mass and the housing of the mouse device, e.g. by moving the inertial mass in one (or a small number) of oscillations. For example, a pulse can include a single impulse of force that quickly rises to a desired magnitude and then is turned off or quickly decays back to zero or small magnitude. The pulse can also be the moving of a cover portion or mouse button to an extreme position and then back to the origin position or other position, in appropriate embodiments.

When the cursor is moved over a number of texture lines spaced at close intervals, a texture feel results. In one embodiment, the line the cursor crosses can be positioned at the center of each region 102, i.e. there need be no width w specified for each region 102. When the cursor crosses the texture line, the actuator is controlled to move the mass linearly up along the z-axis and then return to its rest position, creating a single pulse sensation in the inertial mass embodiments. In some embodiments, a spring compliance is provided which biases the moved mass to the origin position, so that the force on the moving mass need only be removed for the mass to return to its origin position. In other embodiments without any or with inadequate spring compliance, the actuator may have to be energized to move the mass downward back to the origin position. In embodiments having a moveable housing portion or moveable button, the housing portion or button can be moved up along the z-axis and then back to its rest or origin position.

In a different embodiment, the borders to the regions 102 can be used to provide texture pulses. For example, when the cursor is moved from left to right across a left border 106 of a region 102, a pulse can be output by moving the inertial mass upwards and having it return to its origin position. When the cursor continues to be moved to move across the right border 108 of the region 102, another similar pulse can be output. Rapid movement of the cursor over the regions 102 provides a texture-like feel due to the output of the pulses when the borders 106 and 108 of each region are crossed.

The embodiment having left and right borders to the regions can in some embodiments allow a tactile mouse to be used with standard force commands that are also used with more sophisticated kinesthetic devices. For example, if a texture command in the Immersion API is received, in which width, spacing, and magnitude is specified, then these parameters can be modified, if necessary, to fit a tactile paradigm. For example, the spacing and width parameters can be used directly to specify the layout of the regions 102. The magnitude parameter can be used to adjust the magnitude of the pulse output on the tactile mouse, e.g. the acceleration with which the mass is moved or the amount of displacement of the mass along the z-axis. Alternatively, the output force can be scaled as a function of both the magnitude parameter and the current velocity of the device.

Another embodiment adds further refinement to the texture method disclosed above. Since the inertial mass (in an inertial mass embodiment) can preferably be moved either up or down approximately along the z-axis, different types pulses and other haptic effects can therefore be output based on whether the mass is initially moved up or initially moved down. For example, if the mass is initially moved or "popped" up from a rest position and then back down, the user may feel the pulse force pushing the device housing up along the z-axis. If the mass is initially moved down from a rest position and then back up, the user may feel the pulse force pushing the device housing down (especially if a compliant surface, such as a mouse pad, is under the housing). The mass can be initially driven from a spring-biased middle origin position in the range of motion of the mass, where once the mass reaches the desired extreme position (up or down), the actuator is turned off and a physical spring forces the mass back to the origin position. In some embodiments, the mass may be influenced by the actuator to return to the origin position at a desired speed; for example, the physical spring might move the mass too quickly back to the origin position, so the actuator can output a force to slow down the mass motion. In yet other embodiments, a stronger pulse may be desired, so the mass can be first forced to the opposite extreme position before it is moved in the desired direction; this will provide a longer distance of travel for the mass and a greater force. For example, if the maximum-magnitude "up" pulse is desired, the mass can first be set by the actuator to its lowest position, and then quickly forced all the way to its highest position to provide the up pulse. Thus, the pulses of the texture effect can be controlled with a waveform that drives the mass in both directions around the origin position. The mass can also be set at different initial positions in the range of the mass to provide pulses at varying magnitudes.

When using such an inertial mass embodiment, a command from the host computer can be tailored for the embodiment, where a pulse, vibration, or texture can have a "sense" parameter that indicates whether the initial pulse is in the up direction or the down direction.

In the embodiments allowing pulses of different directions (senses), a texture sensation can be output with different senses. For example, the texture may be provided with "up" pulses, providing the user with the sensation that each region 102 is a bump on a flat surface. Or, the texture can be provided with "down" pulses, providing the sensation that each region 102 is a divot or groove in a flat surface. Of course, both up and down regions can be included in a single texture field, or each border to a region 102 can be associated with a different sense. In some embodiments, the sense of regions in a texture field can differ depending on one or more other factors, such as the direction of cursor travel, speed of cursor travel, mode of cursor selection, etc.

In some embodiments, the magnitude of the texture sensation can be affected by the velocity of the cursor within the graphical environment as controlled by the user. It can be disconcerting for the user to encounter a strong pulse at a region 102 when the user is moving the cursor very slowly; such a sensation does not simulate a physical texture well since slow motion over a physical texture does not produce strong sensations. Therefore, the magnitude of texture pulses can be attenuated based on cursor velocity. For example, a threshold velocity can be specified, where the texture magnitude is reduced when cursor velocity is below the threshold. Or, a more continuous adjustment can be implemented, where many different velocities are associated with different magnitudes in a linear or other relationship. It is preferred, however, that the texture magnitude does not go to zero at even a very slow device or cursor velocity.

Other methods of providing a texture can also be implemented in the inertial mass embodiment. For example, when the cursor enters a region 102, the inertial mass can be popped to an up (or down) position and then maintained at that position while the cursor is located within that region 102. Once the cursor exits, the region, the actuator can remove all force to allow the mass to return to its origin position, or the actuator can influence motion of the mass back to its origin position or to a different position. One disadvantage of this embodiment is that the user may not be aware that the mass is being maintained at an extreme position while the cursor is in the region 102, i.e. the user may only be aware of forces when the mass changes position at entering and exiting the region, so that there is no reason to maintain the mass at a position. Another disadvantage of such an embodiment is that more power is consumed by the actuator to maintain the mass at a particular position in opposition to gravity and/or an opposing spring bias. Since many embodiments of the haptic device may access very limited amounts of power (e.g. over a USB or other type of communication interface), this embodiment may not be practical. To alleviate this power problem, however, the mass position can be slowly decayed from the up position back to the origin position after the pulse has been output and the cursor has been moved into a region 102.

In other haptic device embodiments, such as those providing tactile contact forces, the texture sensation command for kinesthetic devices can be more directly mapped to tactile sensations of the device. For example, in the mouse embodiment having a moving cover portion (as described in copending application Ser. No. 09/103,281), the cover portion can be maintained at an extreme position while the cursor is within a region 102. Similarly, in a haptic button embodiment (as described in copending application Ser. No. 09/253,132), the button can be maintained at an extreme position while the cursor is within a region 102. In these embodiments, the user is aware of the position of the cover portion or the button so that a more effective haptic texture sensation can be conveyed. The cover portion or button, for example, can be maintained in an "up" position while the cursor is in a region, where the magnitude of the texture is correlated to the distance that the cover portion or button is moved away from the origin position. Thus, the WIDTH parameter of a texture command can directly influence when the cover portion or button is moved to and maintained at a non-origin position.

Figure 4B:
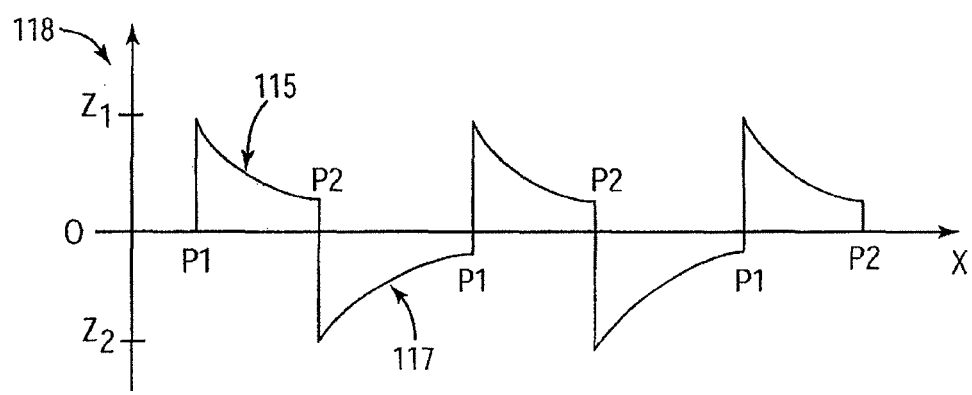

In some embodiments, power to maintain the cover portion or button (or inertial mass) at a non-origin position might be limited; to save power, the cover portion or button can be "decayed" and allowed to move back down to an origin position (e.g. using an inherent physical spring bias) after the initial pulse is conveyed to the user. For example, in FIG. 4a, a texture field is shown having regions 102. An output pulse sequence 118 corresponding to the texture field is shown in FIG. 4b. The vertical axis of graph 118 can be position of the moved element (cover portion, button, or inertial mass) in its z-axis, while the horizontal axis represents motion of the device/cursor across the texture field. At the beginning P1 of each region 102 (in the diagram, assuming movement from left to right), the element can be moved by the actuator to its upper position Z1. Once at its peak Z1, the element can be decayed in position using the inherent spring bias toward the origin position O, as shown by curve 115. When exiting the region 102 at P2, the element is moved down, past the origin position O (if it is still above O), and to a lowest position Z2. The element is then allowed to decay back up to the origin position O with the spring bias, as shown by curve 117, until another texture region 102 is entered, at which point the actuator moves the element back to its peak Z1.

Implementations

The texture sensations described herein can be implemented using a variety of architectures and techniques. These techniques provide texture sensations that are correlated with specific locations displayed in a graphical environment, and are thus more compelling to the user than approximated texture sensations, such as vibrations, that are based on time and duration rather than spatial correlation.

In a preferred embodiment of the present invention, a local microprocessor (or other "processor" or controller such as a state machine, multiple microprocessors, etc.) is provided in the haptic device such as mouse 12. The local microprocessor is dedicated to the mouse 12 to process sensor signals and provide sensor data to the host computer 14. In addition, the local microprocessor also preferably handles force information received by the mouse 12 from the host computer 14 and causes the actuator(s) of the device 12 to output forces. For example, the host computer 14 can output high level commands that are parsed and interpreted by the local microprocessor and cause the local microprocessor to select and execute locally-stored routines to provide a particular haptic sensation to the user. Alternatively, the host computer can output lower-level force information, such as actual force values, which are directly provided to the actuator by the local microprocessor (in the proper form, e.g. analog). These types of architectures are described in greater detail in copending application Ser. No. 09/456,887, filed Dec. 7, 1999, entitled, "Tactile Mouse Device." In other embodiments, no local microprocessor or other controller is provided in the mouse 12, and the host computer can directly output force values and low-level commands to the actuators (or an actuator interface including, e.g., digital to analog converters and/or pulse width modulation outputs) on the device.

For example, in one embodiment, texture sensations are implemented using a local processor. The local processor can initially be provided data about the locations of one or more graphical objects, such as a texture field 100, in the graphical environment, as well as the size of such objects. The local processor stores these object locations in memory and monitors the cursor position by checking mouse sensor data. When the cursor is moved into a texture field, the local processor knows this by checking its locally-stored object locations, and the local processor can then output a texture force such as a pulse. This implementation greatly increases the response time of haptic sensations, since the local processor can handle much of the cursor interactions without having to communicate with the host.

One difficulty that can occur with position-based force output such as texture sensations is that, when using a relative reporting device such as mouse 12 that reports changes in position to the host, the haptic sensations can be difficult to correlate with the spatially-based interactions of the cursor. As described in copending patent application Ser. No. 09/970,953, incorporated herein by reference, the correlation difficulty arises due to many factors, one of which is that the host computer performs ballistics calculations. Ballistics is the term used for the modification of cursor position in the graphical environment based on the velocity of the mouse in the mouse workspace. It is much easier for the user to control a cursor if the cursor is moved in smaller increments when the mouse is moved slowly and if the cursor is moved in larger increments when the mouse is moved quickly. Thus, the mouse can be moved across the same distance in its workspace multiple times, but the cursor can be moved different distances in the graphical environment each time if the mouse is moved at different velocities. Typically, the host uses a "ballistic scale factor" to scale the cursor motion based on mouse velocity, e.g., if the ballistic scale factor is 2, then the cursor is moved approximately twice as far as the mouse. The scale factor can be set by a user in a preferences control panel, or may be determined based on a variety of factors; the actual ballistics calculations can vary in different programs and operating systems. For example, one or more discrete velocity thresholds can be used, where the device velocity above a threshold causes a higher scale factor to be used than velocities below the threshold (alternatively, scale factor can be continuously varied as based on device velocity). Ballistics is described in greater detail in copending application Ser. No. 09/924,462, incorporated herein by reference. Other factors can also lead to the correlation problems, including host influence over the cursor independent of device input (e.g., moving the cursor to graphical buttons and the like), multiple devices connected to the host computer, etc.

The difficulty arises due to the fact that the host computer typically calculates cursor position using ballistics algorithms. As described above, the local microprocessor on the mouse 12 can determine when to initiate or deactivate a position-based haptic sensation based on cursor interaction with a graphical object or region, i.e. the local microprocessor preferably "gates" (turns on or off) haptic sensations based on cursor location. However, since the host is performing ballistics calculations to modify the displayed cursor position, the local microprocessor does not know the actual cursor position ("ballistic position") after the ballistics have been performed.

One solution to this problem is for the host computer to periodically transmit information back to the local microprocessor so that the local microprocessor can model a ballistic position on its own between periodic reports from the host, thus still allowing the microprocessor to gate haptic sensations. This is described in detail in copending application Ser. No. 09/970,953, and can be used in the present invention to allow the local microprocessor to activate and deactivate texture sensations based on a modeled cursor location.

In one embodiment, the local microprocessor can exactly model the ballistics position of the cursor, using the same method that the host uses. For example, the host can send all relevant ballistics information upon startup to the device to allow the local microprocessor to perform this function. The local processor can even calculate and report the actual ballistics position to the host so that the host need not calculate it. In other embodiments, the local microprocessor can apply a simpler approximation to model ballistics than the host's actual ballistics computation method. This can be advantageous since the microprocessor is typically much more limited in processing power and must respond quickly to mouse motion events. Also, host ballistic models can vary greatly depending on the active application program, the operating system used, and/or complex user preferences. In those embodiments providing a simpler ballistics model for the local processor, the host can still send down basic ballistics information to the local microprocessor, such as the currently-used ballistic scale factor.

In some embodiments, problems can arise in the above-described embodiment when the local microprocessor's model of ballistics greatly deviates from the actual ballistics positions being calculated by the host. Some embodiments provide for the host to send down actual "correct" ballistics positions to the device to allow the local microprocessor to "resynch" its own model with the host's ballistics calculations. However, due to communication bandwidth and latency limitations, the host may not update the microprocessor with the actual ballistics position often enough to avoid discontinuities and delays in the output of haptic sensations, which can be disconcerting to the user. These problems, however, are typically not as severe when used with the texture sensations of the present invention. This is because a texture sensation need not be exactly correlated with the "bumps" or predefined regions 102 in the texture field. If the user is moving a cursor rapidly through a texture field, he or she will not usually detect whether the haptic pulses are slightly delayed from when the cursor actually passes over the associated regions. As long as the general spatial quality of the "bumps" is conveyed and correlated with mouse speed, the haptic texture feedback is usually effective.

If the local microprocessor has a local representation of graphical objects in its memory, then its ballistics model can also be used to gate the texture sensation, i.e. determine when the cursor enters or exits a texture field. However, although the spatial texture itself does not suffer greatly from the approximated ballistics model implemented by the local microprocessor, the user may notice the discontinuities or delays in some embodiments when cursor enters or exits a texture field. For example, the user should immediately feel a texture when entering a texture field, but there may be a delay due to the microprocessor's approximation having deviated significantly from the actual cursor position.

Thus, in a preferred embodiment, the host computer can provide the gating function, i.e., the host can send a signal or command to the microprocessor to turn on haptic sensations such as textures when the cursor interacts with a graphical object such as a texture field, and the host can send a different signal or command to turn off the haptic sensation when the cursor ceases interacting with the object (e.g., moves outside the object boundaries).

In some embodiments, the local processor does not model ballistic cursor position at all, even if the host might do so. For example, there may not be a need for the local processor to model ballistics if the user cannot readily discern the difference between velocity of the cursor and frequency of texture sensations. This can be most apparent in small graphical objects where the texture field is passed over quickly by the cursor. Thus, the local processor can model a cursor position within the texture field based only on the sensor data providing device change in position and using no ballistics or other modifications. The host may still gate the texture effects in this embodiment.

Figure 3A:
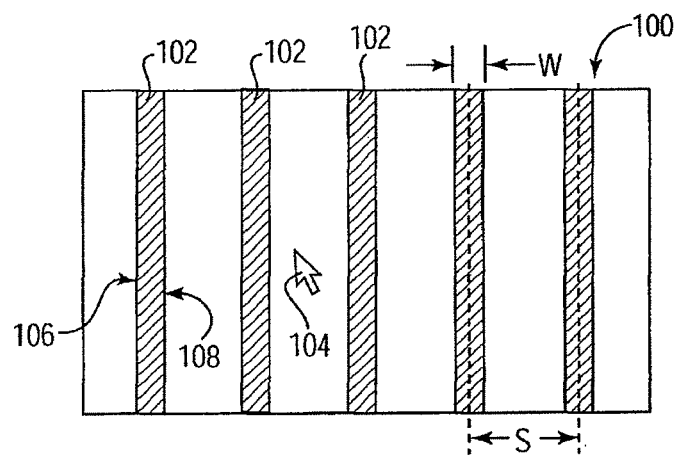
FIGS. 3a-3c are diagrammatic illustrations of texture fields providing texture sensations in the present invention.
Figure 3B:
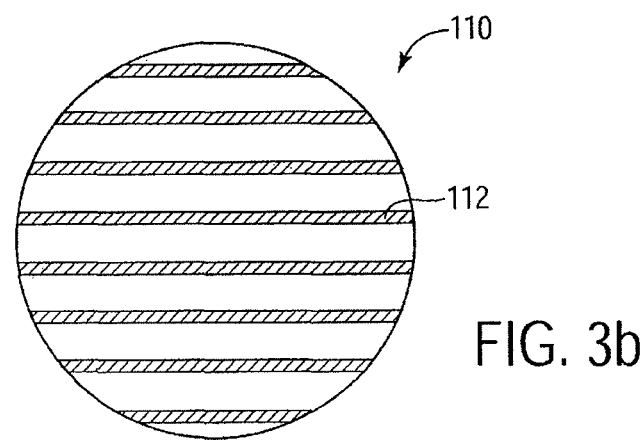
Figure 3C:
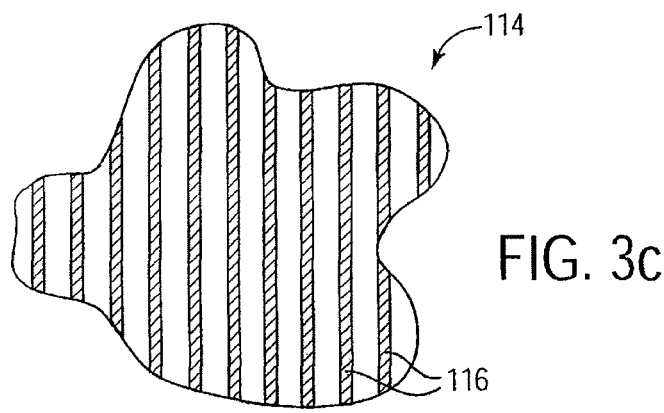

FIGS. 3b and 3c illustrate texture fields which can be provided in other shapes besides the rectangular field 100 of FIG. 3a. Texture field 110 is a circular or elliptical field and includes horizontal regions 112 which are similar to regions 102 of FIG. 3a. Texture field 114 is an irregularly-shaped texture field and includes regions 116 which are similar to the regions 102 and 112. The sensations for these fields, and the field 100 of FIG. 3a, can be gated using the host computer to monitor cursor motions. When the cursor moves into or out of the field, the gating information is sent to the device.

One way to implement the texture fields in FIGS. 3a-3c is use graphical objects known as enclosures, which have defined sizes and shapes (rectangle, ellipse, irregular polygon, etc.) and which can be associated with a variety of haptic sensations based on which side of the enclosure the cursor enters, whether the cursor enters or exits the enclosure, the speed of entering or exiting, etc. In this embodiment, the cursor moving into the enclosure is an event which would cause the host to send commands to the local processor that turn the texture effect inside the enclosure on or off. Thus, a texture sensation assigned to the interior of the enclosure would be active once the host computer signals the microprocessor that the cursor has entered the enclosure. The microprocessor would then implement the texture sensation based on a texture command and parameters immediately or previously received from the host. For example, the microprocessor can interpret sensor signals to determine when the cursor crosses the texture regions 102 within the enclosure. The host computer can again send a signal or command to the microprocessor to deactivate the texture sensation when the cursor is detected to exit the enclosure. In the preferred embodiment, the microprocessor can ignore its modeled ballistics position for gating purposes (e.g. upon cursor exit). Thus, by allowing the host's ballistic position to control the gating of haptic sensations, and allowing the local microprocessor's ballistic model to control the magnitude and timing of the texture pulses, a practical compromise is reached. A limiting factor can be communication speed between host and microprocessor; the gating commands from the host should preferably reach the microprocessor in sufficient time as to avoid a large delay or discontinuity in output forces to the user.

Figure 5:
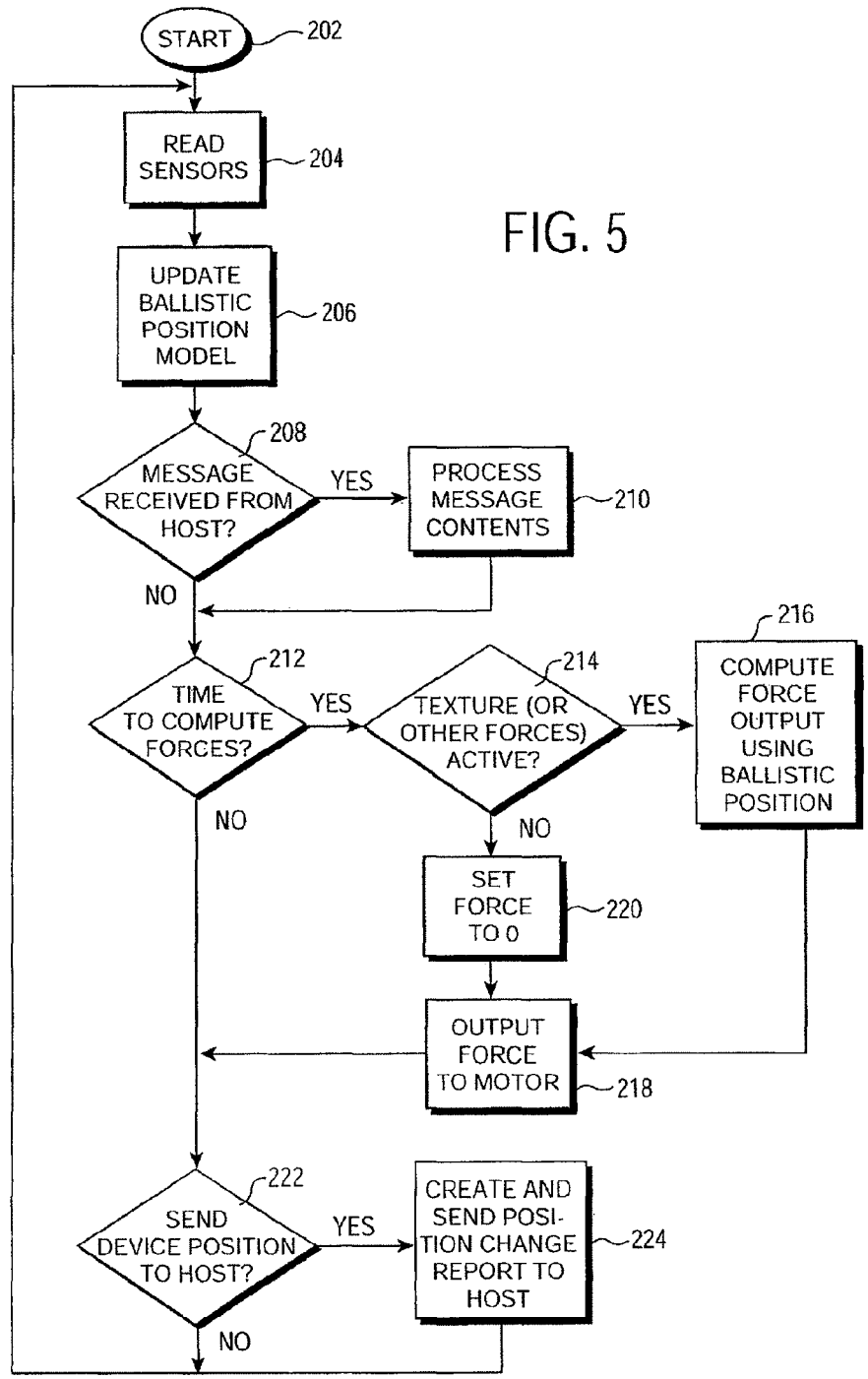
FIG. 5 is a flow diagram showing one method of the present invention for providing texture sensations using the mouse of FIG. 1.

FIG. 5 is a flow diagram illustrating a method 200 incorporating the features described in the embodiment just described. The method begins at 202, and in step 204, the sensor(s) on the mouse 12 (or other haptic device) read the current device position. Since the device 12 is a relative device, the relative sensors read a change in position from the last position read. In the next step 206, the local processor on the device 12 updates the cursor position model maintained by the local processor, such as a ballistic position. The ballistic position of the cursor is based on the change in device position as determined by the sensor data from the sensors from step 204 and uses a ballistics method to model cursor position as closely as possible to the host's determined cursor position. In some embodiments, the host can send as parameters any ballistics parameters that the local processor may need to determine the ballistics position, such as a scale factor and/or one or more mouse velocity thresholds—this information can be sent at any convenient time, e.g., upon startup of the device, before an application is executed, or when any message or command from the host is received. The microprocessor can use any of a variety of methods to calculate a ballistics position. Preferably, a simpler calculation is used as to not consume significant processing power. For example, the local processor can use only one velocity threshold, even if the host is using multiple thresholds. The local processor, for example, could simply provide twice the cursor speed if the current mouse velocity is over the single velocity threshold. Alternatively, the local processor can calculate a modeled cursor position based purely on its own model and not use any ballistics parameters from the host; the microprocessor model, for example, can be a standardized model that is close to existing host ballistics methods. In yet other embodiments, no ballistics model is used by the local processor, where the local processor models cursor position based only on sensor data and not velocity or other factors. In other embodiments, the host computer can send the most recent host-calculated ballistic position of the cursor as an initial value for the local processor to begin its ballistic model.

In step 208, the local processor checks whether it has received a message or command from the host computer. If so, in step 210 the local processor processes the message contents and stores any parameters or data provided with the command. In the content of the textures of the present invention, the host can send a command to start the output of ("activate") a texture sensation, which acts as a texture gating command, when the host determines that the cursor has entered (or otherwise interacted with) a texture field. The host may also send a command to stop the output of ("deactivate") the texture sensation as a different gating command, e.g. when the host determines (via the host-calculated ballistics position) that the cursor has exited the texture field, or for some other reason. Of course, other types of host commands can also be received in steps 208-210, such as other types of force commands, commands to load a force effect into local memory (which include the necessary parameters or data), commands to play or stop playing previously loaded force effects, device state commands, reporting commands, etc.

In some embodiments, the local processor can store multiple force effects (i.e. the data and parameters needed to output the force sensation) in local memory, including multiple texture effects and other types of force effects. Each time step 216 is performed, each force effect in local memory is processed. In some embodiments, the received gating command, or a separate command, can cause the output of a previously-loaded texture effect in local memory, or alternatively can cause both the loading and output of the texture effect. Similarly, a host command can cause the output of a playing texture effect to stop, or can cause both the stopping of the effect and the removal of the texture sensation data from its effect slot in the memory of the device. If no command has been received in step 208, then the process continues to step 212.

In step 212, the local processor checks whether forces should be computed and output. Preferably, forces are output at a rate of about 1000 Hz; if the process is running faster than the desired output rate, then it may not be time to output forces. Or, in some embodiments, a previous force output may have been slow and the next force should be output at a discrete time interval in the future. Thus, if a force is not be currently output, the process continues to step 222. If the time to output forces has arrived, then in step 214 it is checked whether a texture or other types of forces are active, i.e. have been previously started and are continuing. If so, then in step 216 the local processor computes a force. If a texture force is active, the force is computed using the ballistic position modeled in step 206 and any other parameters, such as texture parameters received in a host texture command, a calculated velocity or acceleration, etc. In some embodiments, a standard pulse of predefined magnitude can be used for all textures. In other embodiments, a texture magnitude may have been specified by a host texture command, and/or the position and movement of the inertial mass, cover portion, or button may be different depending on the specified magnitude, spacing, or cursor motion. Once the texture force has been determined, the force is output to the actuator(s) of the device 12 in step 218. The process then continues to step 222. It should be noted that other forces can also be active simultaneously with the texture force; thus, for example, if a vibration is currently active, it is also computed in step 216 and the vibration force is added to the texture force and output as a total force in step 218. In some embodiments, the force contributions from each active force effect can be reduced in magnitude to allow all force effects to be felt in the limited range of the actuator. In addition, multiple texture effects can similarly be in effect simultaneously.

If no forces are active in step 214, then in step 220, the local processor sets the output force to zero, and this zero force is output in step 218 (i.e. no force is output).

After step 218, step 220 is initiated, in which the local processor checks whether to send the device position to the host. In a preferred embodiment, the steps described above, including reading sensors, computing forces, and outputting forces, occurs at about 1000 Hz to allow realistic force sensations to be output. However, sensor data need only be reported to the host at a much lower rate, such as 60 to 100 Hz. Thus, in step 222 the local processor checks whether the time has arrived to report data to the host which would allow a reporting rate of; for example, 100 Hz. If such a time has arrived, in step 224 the local processor creates and sends the position change to the host computer as a delta position, similarly to any existing, relative non-haptic mouse. To "create" the position change, the local processor preferably sums the device position changes read from the sensors 204 over the previous iterations of step 204 (since the last report) so that the total change in position of the device can be reported at step 222 to the host computer. Each time the change in position is reported, the sum of position changes is reset to zero. After step 224, or if a reporting interval has not yet arrived in step 222, then the process then returns to step 204 to read the device sensors.

In some embodiments, the host may send updated commands during or between any of the above steps to, for example, adjust the feel of the active texture sensation or the modeling of the ballistic position.

It should be noted that the above process using a locally-modeled ballistics position and host gating of haptic sensations can also be used with other types of haptic sensations besides textures. For example, any haptic sensations associated with an enclosure can use this process, since the enclosure is an object having a particular location in the graphical environment and its associated haptic sensations are only active when the cursor interacts with the enclosure. For example, a damping field associated with the inside of an enclosure can be similarly gated by host commands. Some force effects that can be converted or simulated with a tactile device (such as a device described herein) are described in copending provisional application No. 60/156,354, which is incorporated herein by reference.

The host functionality for sending gating commands or otherwise signaling the gating of spatially-based haptic sensations such as textures can be implemented in a force feedback driver running on the host computer and communicating with higher levels of software such as higher level drivers, an API, an operating system, and/or one or more application programs. Having a separate driver handle such communication is preferred since the other host programs do not then need to be specially configured for haptic feedback functionality, e.g. the operating system on the host can receive relative input from the mouse 12 just like any other non-haptic mouse, and process the cursor position with ballistics algorithms to display the cursor as normally performed with standard mouse devices.

In other embodiments, the local microprocessor can perform all of the ballistics calculations in parallel with the host; or, the local microprocessor can perform the only ballistics calculations and can provide the ballistic position to the host computer for the display of the cursor. This allows the haptic sensations to be synchronized with cursor position without error. However, this embodiment is best implemented when the device keeps track of all the graphical objects with which the cursor can interact and cause force sensations, which requires a more powerful and expensive microprocessor to be included in the mouse 12 to perform these calculations. Such an embodiment also may require specialized software to be running on the host which will display a cursor based on a received ballistic position, rather than determining a ballistic position from received raw data as is currently performed with existing mice. In such an embodiment, the host may provide user preferences information to the local processor (e.g., upon startup of the device and when a preference is changed by the user) to allow the ballistics calculations of the processor to be performed in accordance with user preferences (e.g. cursor speed and acceleration, "smart move" to allow a cursor to jump to a highlighted button, etc.).

While this invention has been described in terms of several preferred embodiments, it is contemplated that alterations, permutations and equivalents thereof will become apparent to those skilled in the art upon a reading of the specification and study of the drawings. For example, many different embodiments of haptic feedback devices can be used to output the texture sensations described herein. Furthermore, certain terminology has been used for the purposes of descriptive clarity, and not to limit the present invention. It is therefore intended that the following appended claims include alterations, permutations, and equivalents as fall within the true spirit and scope of the present invention.

That which is claimed:

1. A method for providing haptic feedback, comprising:
   receiving a signal from a sensor, the sensor signal associated with a change in a position of a haptic feedback device;
   transmitting sensor data to a host processor, the sensor data associated with the sensor signal;
   receiving force information from the host processor, the force information comprising a texture sensation having at least one parameter describing at least one force to be output based at least in part on an interaction of a graphical object with a texture field, the force information further comprising at least one characteristic of the texture sensation;
   parsing the force information;
   storing the at least one characteristic; and
   determining when to output the at least one force based at least in part on the interaction.

2. The method of claim 1, further comprising outputting the at least one force to the haptic feedback device.

3. The method of claim 2, wherein the at least one force is output in a direction orthogonal to the change in position of the haptic feedback device.

4. The method of claim 1, wherein the texture sensation is associated with a texture field.

5. The method of claim 4, further comprising determining a modeled position of the graphical object based on the interaction.

6. The method of claim 5, wherein determining the modeled position of the graphical object comprises determining a velocity of the haptic feedback device or the graphical object.

7. The method of claim 6, wherein the at least one force is based at least in part on the modeled position of the graphical object.

8. The method of claim 1, wherein determining when to output the at least one force comprises receiving a gating command configured either to cause the at least one force to be output or to stop the at least one force from being output.

9. The method of claim 1, wherein the haptic feedback device comprises a mouse.

10. The method of claim 1, wherein the texture sensation comprises a plurality of parameters, including a width parameter, a spacing parameter, and a magnitude parameter.

11. A non-transitory computer-readable medium comprising program code to cause a processor to execute a method for providing haptic feedback, the method comprising:
    receiving a signal from a sensor, the sensor signal associated with a change in a position of a haptic feedback device;
    transmitting sensor data to a host processor, the sensor data associated with the sensor signal;
    receiving force information from the host processor, the force information comprising a texture sensation having at least one parameter describing at least one force to be output based at least in part on an interaction of a graphical object with a texture field, the force information further comprising at least one characteristic of the texture sensation;
    parsing the force information;
    storing the at least one characteristic; and
    determining when to output the at least one force based at least in part on the interaction.

12. The method of claim 11, further comprising outputting the at least one force to the haptic feedback device.

13. The method of claim 12, wherein the at least one force is output in a direction orthogonal to the change in position of the haptic feedback device.

14. The method of claim 11, wherein the texture sensation is associated with a texture field.

15. The method of claim 14, further comprising determining a modeled position of the graphical object based on the interaction.

16. The method of claim 15, wherein determining the modeled position of the graphical object comprises determining a velocity of the haptic feedback device or the graphical object.

17. The method of claim 16, wherein the at least one force is based at least in part on the modeled position of the graphical object.

18. The method of claim 11, wherein determining when to output the at least one force comprises receiving a gating command configured either to cause the at least one force to be output or to stop the at least one force from being output.

19. The method of claim 11, wherein the haptic feedback device comprises a mouse.

20. The method of claim 11, wherein the texture sensation comprises a plurality of parameters, including a width parameter, a spacing parameter, and a magnitude parameter.

* * * * *